US012089792B2

(12) United States Patent
Kessler et al.

(10) Patent No.: US 12,089,792 B2
(45) Date of Patent: Sep. 17, 2024

(54) CLEANING ROBOT COMPRISING A CLEANING CLOTH AND A CLEANING AGENT

(71) Applicant: Henkel AG & Co. KGaA, Duesseldorf (DE)

(72) Inventors: Arnd Kessler, Monheim am Rhein (DE); Slavoljub Barackov, Monheim am Rhein (DE); Ingo Hardacker, Hamminkeln (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 148 days.

(21) Appl. No.: 17/685,569

(22) Filed: Mar. 3, 2022

(65) Prior Publication Data

US 2022/0183527 A1 Jun. 16, 2022

Related U.S. Application Data

(63) Continuation of application No. PCT/EP2020/074363, filed on Sep. 1, 2020.

(30) Foreign Application Priority Data

Sep. 5, 2019 (DE) ......................... 102019213539.0

(51) Int. Cl.
*A47L 11/28* (2006.01)
*A47L 11/40* (2006.01)
(Continued)

(52) U.S. Cl.
CPC ........... *A47L 11/28* (2013.01); *A47L 11/4036* (2013.01); *A47L 11/4083* (2013.01); *C11D 1/83* (2013.01);
(Continued)

(58) Field of Classification Search
None
See application file for complete search history.

(56) References Cited

U.S. PATENT DOCUMENTS 7,465,697 B1 * 12/2008 DeAth .................. A01N 65/22
510/132
8,898,844 B1 * 12/2014 Dooley .................. A47L 11/10
15/49.1
(Continued)

FOREIGN PATENT DOCUMENTS

CN 103796564 A 5/2014
CN 108641822 A 10/2018
(Continued)

OTHER PUBLICATIONS

The Patent Office of the State Intellectual Property Office, Search Report, Application No. 2020800618987, Feb. 9, 2023, pp. 4-6, Jiangsu, China.

(Continued)

*Primary Examiner* — Natasha N Campbell
*Assistant Examiner* — Pradhuman Parihar
(74) *Attorney, Agent, or Firm* — CANTOR COLBURN LLP

(57) ABSTRACT

The present invention relates to a cleaning robot having a cleaning cloth and a cleaning agent and also to the use of a concentrated cleaning agent in such a cleaning robot.

16 Claims, 1 Drawing Sheet

(51) Int. Cl.

| | |
|---|---|
| ***C11D 1/22*** | (2006.01) |
| ***C11D 1/72*** | (2006.01) |
| ***C11D 1/83*** | (2006.01) |
| ***C11D 17/04*** | (2006.01) |

(52) U.S. Cl.

CPC ......... *C11D 17/049* (2013.01); *A47L 2201/00* (2013.01); *C11D 1/22* (2013.01); *C11D 1/72* (2013.01)

(56) References Cited

U.S. PATENT DOCUMENTS

| | | | | |
|---|---|---|---|---|
| 2009/0246862 | A1 | 10/2009 | Rao et al. | |
| 2019/0223677 | A1* | 7/2019 | Yoon .................... | B25J 11/0085 |

FOREIGN PATENT DOCUMENTS

| | | | |
|---|---|---|---|
| DE | 102013108905 | A1 | 2/2015 |
| DE | 202017107847 | U1 | 2/2018 |
| DE | 102017118226 | A1 | 2/2019 |
| EP | 1470208 | B1 | 9/2006 |
| EP | 2781178 | A1 | 9/2014 |
| EP | 3040009 | A2 | 7/2016 |
| EP | 3482669 | A1 | 5/2019 |

OTHER PUBLICATIONS

DE Search Report DE 10 2019 213 539.0 Completion Date: Aug. 30, 2020; Mail Date: Aug. 30, 2020 7 Pages.

PCT International Search Report PCT/EP2020/074363 Completion Date: Nov. 3, 2020; Mail Date: Nov. 16, 2020 2 Pages.

Mar. 14, 2023 Third Party Observation filed in corresponding EP Appln 20767747.7; 4 pages.

* cited by examiner

CLEANING ROBOT COMPRISING A CLEANING CLOTH AND A CLEANING AGENT

FIELD OF THE INVENTION

The present invention relates to a cleaning robot comprising a cleaning cloth and a cleaning agent, and to the use of a concentrated cleaning agent in such a cleaning robot.

BACKGROUND OF THE INVENTION

Cleaning robots for wet wiping which comprise a cleaning cloth and a cleaning agent are known from the prior art, with the cleaning robot being designed to guide the cleaning cloth over a hard surface. This makes it convenient to clean hard surfaces without the consumer having to guide the tablecloth themselves, as is the case with conventional manual surface cleaning. Such cleaning robots allow convenient and thorough cleaning of hard surfaces.

The use of a cleaning agent is required to enable thorough cleaning of hard surfaces. The use of at least one surfactant can effectively remove dirt from the hard surfaces.

Nevertheless, it has been found that the cleaning performance of cleaning agents known from the prior art is not satisfactory when used in a cleaning robot.

BRIEF SUMMARY OF THE INVENTION

The object of the present invention was thus to provide a cleaning robot comprising a cleaning agent which enables improved cleaning performance.

This object is achieved by a cleaning robot comprising a cleaning cloth and a cleaning agent, with the cleaning robot being designed to guide the cleaning cloth over a hard surface, characterized in that the cleaning agent has a surface tension of at most 40 mN/cm, preferably at most 38 mN/cm and particularly preferably at most 35 mN/cm, when measured dynamically at 23° C. at a surface age of 0.3 seconds.

Without being bound to any theory, the following findings were made in the present case:

Surfactants lower the surface tension of aqueous compositions and thus enable effective surface cleaning. The lowering of the surface tension is achieved by the accumulation of the surfactants on the surface. This is a dynamic process, and so the equilibrium value of the surface tension is not set immediately after film formation, but only after a certain period of time. It is observed here that the surface tension approaches the surface tension equilibrium value over time from an initially relatively high value. In other words, sufficiently low surface tension values for good cleaning become apparent only after a certain period of time.

In the case of manual surface cleaning, the cleaning agent is applied to the hard surface. For this purpose, the cleaning agent is either applied directly to the surface or a cleaning cloth is soaked in the cleaning agent. In any case, with such manual cleaning, a certain amount of time passes before the actual cleaning process takes place. The surfactants have sufficient time to accumulate on the surface of the cleaning agent film that has formed and thus reduce the surface tension. In other words, in the manual cleaning process, the cleaning agent usually has the equilibrium value of the surface tension.

In the case of automatic surface cleaning by means of a cleaning robot, the cleaning agent is applied to the hard surface, and the wiping process taking place substantially at the same time as the cleaning agent is applied. In contrast with manual cleaning, the surfactants only have a short time to accumulate on the surface of the cleaning agent film that has formed and thus reduce the surface tension. In other words, during the automatic cleaning process, the cleaning agent generally does not have the equilibrium value of the surface tension. In order to enable effective cleaning, a cleaning agent must be used in which a sufficiently strong reduction in surface tension has already taken place shortly after film formation.

DETAILED DESCRIPTION OF THE INVENTION

Figure 1:
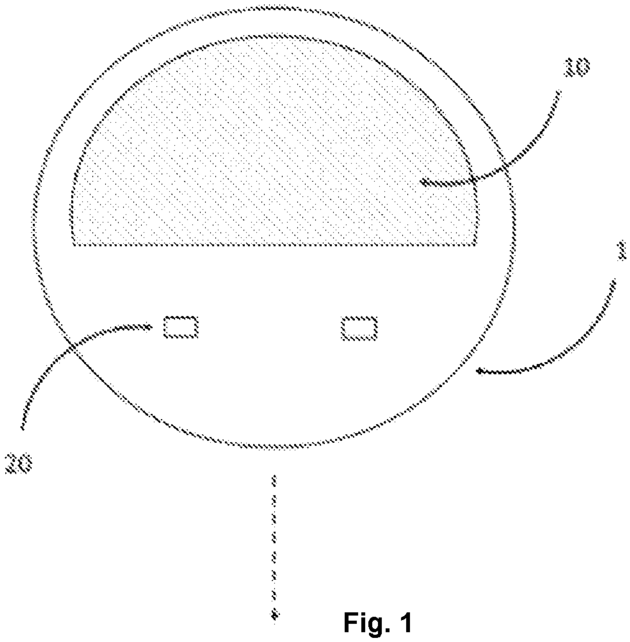
FIG. 1 shows a cleaning robot comprising a cleaning cloth in a view from below.

According to the invention, the dynamic surface tension is determined by means of bubble pressure tensiometry. These methods are known to a person skilled in the art. An air bubble is generated in the liquid to be examined for a certain period of time. The measurement value that occurs during this period corresponds to the surface tension at a certain surface age. If the lifetime of the air bubble, i.e. the surface age, is then changed, the surface tension of the cleaning liquid can be determined on the basis of the surface age. The measurements take place under standard conditions, in particular at a temperature of 23° C.

According to a particularly preferred embodiment, the cleaning robot is designed to guide the cleaning cloth over the hard surface at a speed of at least 5 cm/s, preferably at least 10 cm/s, more preferably at least 20 cm/s. In particular in the case of such fast-moving cleaning robots, it was found that an improvement in cleaning performance can be achieved if a cleaning agent is used which has a surface tension of at most 40 mN/cm, preferably at most 38 mN/cm and particularly preferably at most 35 mN/cm, when measured dynamically at 23° C. at a surface age of 0.3 seconds. As already described above, in the automatic cleaning process with fast cleaning robots the cleaning agent usually does not have its equilibrium value. A cleaning agent must therefore be used in which a sufficiently strong reduction in surface tension has already taken place shortly after film formation.

According to a preferred embodiment of the cleaning robot, the cleaning cloth is guided over the hard surface at a speed of at least 5 cm/s, preferably at least 10 cm/s, more preferably at least 20 cm/s.

According to a preferred embodiment of the cleaning robot, the decrease in the surface tension of the cleaning agent is at least 2 mN/cm, preferably 5 mN/cm, within a surface lifetime of 0.3 seconds when measured dynamically at 23° C.

According to a preferred embodiment of the cleaning robot, the cleaning robot is designed to convey the cleaning agent out of a cleaning agent tank and apply it to the cleaning cloth.

According to a further aspect of the invention, the use of a concentrated cleaning agent in a cleaning robot is described, characterized in that the cleaning agent is diluted with water in the robot and, after at least ten-fold dilution, preferably approximately 14-fold dilution in the cleaning robot, has a surface tension of at most 40 mN/cm, preferably at most 38 mN/cm and particularly preferably at most 35 mN/cm, when measured dynamically at 23° C. at a surface age of 0.3 seconds. A tenfold dilution is understood to mean that there are 10 parts of water for one part of concentrated cleaning agent.

According to a preferred embodiment, the use of the concentrated cleaning agent is described, with the cleaning robot being designed to guide the cleaning cloth over the hard surface at a speed of at least 5 cm/s, preferably at least 10 cm/s, more preferably at least 20 cm/s.

The concentrated cleaning agent formulations according to the invention are described below by way of example, without the invention being restricted to these exemplary embodiments. If ranges, general formulas or compound classes are specified below, these are not only intended to include the corresponding ranges or groups of compounds that are explicitly mentioned, but also all sub-ranges and sub-groups of compounds that can be obtained by removing individual values (ranges) or compounds. If compounds such as polyethers are described in the context of the present invention, which may have various units multiple times, these may occur in a randomly distributed manner (random oligomer) or in an ordered manner (block oligomer) in these compounds. Information relating to the number of units in such compounds is to be understood as an average value, averaged over all corresponding compounds.

Within the scope of the present invention, unless stated otherwise, fatty acids and/or fatty alcohols and/or the derivatives thereof represent branched or unbranched carboxylic acids and/or alcohols and/or the derivatives thereof preferably having 6 to 22 carbon atoms. The former are particularly preferred for ecological reasons on account of the vegetable basis thereof, based on sustainable raw materials, but the teaching according to the invention is not restricted thereto. In particular, the oxo-alcohols or derivatives thereof which can be obtained, for example, by Roelen's oxo synthesis can be used accordingly.

Whenever alkaline earth metals are mentioned in the following as counterions for monovalent anions, this means that the alkaline earth metal is naturally only present in half the amount of substance—sufficient to balance the charge—of the anion.

Substances that are also used as ingredients of cosmetic agents are also designated in the following according to the International Nomenclature Cosmetic Ingredient (INCI) as appropriate. Chemical compounds have an English INCI name, botanical ingredients are listed exclusively in Latin, in accordance with Linne, and what are known as common names such as "water," "honey" or "sea salt" are also specified in Latin. The INCI names can be found in the International Cosmetic Ingredient Dictionary and Handbook—Seventh Edition (1997), which is published by The Cosmetic, Toiletry, and Fragrance Association (CTFA), 1101 17th Street, NW, Suite 300, Washington DC 20036, USA and contains over 9,000 INCI names and references to over 37,000 trade names and technical names, including the associated distributors from over 31 countries. The International Cosmetic Ingredient Dictionary and Handbook assigns the ingredients one or more chemical classes, for example Polymeric Ethers, and one or more functions, for example Surfactants—Cleansing Agents, which it then explains in greater detail and to which reference may also subsequently be made.

The expression CAS means that the following numerical sequence is a designation of the Chemical Abstracts Service.

Unless explicitly stated otherwise, the amounts stated in percent by weight (wt. %) are based on the total agent. These percentage amounts relate to the active content.

Non-Ionic Surfactants

Non-ionic surfactants within the scope of the invention can be alkoxylates such as polyglycol ethers, fatty alcohol polyglycol ethers, alkylphenol polyglycol ethers, end-capped polyglycol ethers, mixed ethers and hydroxy mixed ethers and fatty acid polyglycol esters. Ethylene oxide-propylene oxide block polymers, fatty acid alkanolamides and fatty acid polyglycol ethers can also be used. A further significant class of non-ionic surfactants that can be used according to the invention are polyol surfactants and here, in particular, glycol surfactants such as alkyl polyglycosides and fatty acid glucamides. Particularly preferred are alkyl polyglycosides, in particular, alkyl polyglucosides, with the alcohol particularly preferably being a long-chain fatty alcohol or a mixture of long-chain fatty alcohols and branched or unbranched $C_8$- to $C_{18}$ alkyl chains and the degree of oligomerization (DP) of the sugars being between 1 and 10, in particular 1 to 6, preferably 1.1 to 3, most preferably 1.1 to 1.7, for example $C_{8-10}$-alkyl-1.5-glucoside (DP of 1.5). In addition, fatty alcohol alkoxylates (fatty alcohol polyglycol ethers) are also preferred, in particular with ethylene oxide (EO)- and/or propylene oxide (PO)-alkoxylated, unbranched or branched, saturated or unsaturated $C_{8-22}$ alcohols having a degree of alkoxylation of up to 30, preferably ethoxylated $C_{12-22}$ fatty alcohols having a degree of ethoxylation of less than 30, in particular 12 to 28, preferably 20 to 28, particularly preferably 25, for example $C_{16-18}$ fatty alcohol ethoxylates having 25 EO.

In addition to or independently of the non-ionic surfactant, the cleaning agent according to the invention can contain at least one anionic surfactant. Preferred anionic surfactants are fatty alcohol sulfates, fatty alcohol ether sulfates, dialkyl ether sulfates, monoglyceride sulfates, alkylbenzene sulfonates, olefin sulfonates, alkane sulfonates, ether sulfonates, n-alkyl ether sulfonates, ester sulfonates and lignosulfonates. Fatty acid cyanamides, sulfosuccinates (sulfosuccinic acid esters), in particular sulfosuccinic acid mono- and di-$C_8$-$C_{18}$-alkyl esters, sulfosuccinamates, sulfosuccinamides, fatty acid isethionates, acylamino alkane sulfonates (fatty acid taurides), fatty acid sarcosinates, ether carboxylic acids and alkyl (ether) phosphates, and $\alpha$-sulfo fatty acid salts, acylglutamates, monoglyceride disulfates and alkyl ethers of glycerol disulfate can also be used within the scope of the present invention.

Linear alkylbenzene sulfonates, fatty alcohol sulfates and/or fatty alcohol ether sulfates, in particular fatty alcohol sulfates, are preferred within the scope of the present invention. Fatty alcohol sulfates are products of sulfation reactions on corresponding alcohols, while fatty alcohol ether sulfates are products of sulfation reactions on alkoxylated alcohols. A person skilled in the art generally understands alkoxylated alcohols to be the reaction products of alkylene oxide, preferably ethylene oxide, with alcohols, preferably with longer-chain alcohols within the meaning of the present invention. In general, a complex mixture of addition products of different degrees of ethoxylation is created from n moles of ethylene oxide and one mole of alcohol, depending on the reaction conditions. Another embodiment of the alkoxylation consists in using mixtures of alkylene oxides, preferably the mixture of ethylene oxide and propylene oxide. The sulfates of low-ethoxylated fatty alcohols having 1 to 4 ethylene oxide units (EO), in particular 1 to 2 EO, e.g. 1.3 EO, are preferred fatty alcohol ether sulfates. Preferred alkylbenzene sulfonates are in particular those having approximately 12 C atoms in the alkyl moiety, such as linear sodium-$C_{10-18}$-alkylbenzene sulfonate. Preferred olefin sulfonates have a carbon chain length of 14 to 16.

The anionic surfactants are preferably used as sodium salts, but can also be contained as other alkali or alkaline earth metal salts, for example magnesium salts, and in the form of ammonium salts or mono-, di-, tri- or tetraalkylammonium salts, and in the case of the sulfonates, also in the form of their corresponding acids, e.g. dodecylbenzenesulfonic acid.

In addition to the types of surfactants mentioned thus far, the agent according to the invention can also contain cationic surfactants and/or amphoteric surfactants.

Suitable amphoteric surfactants are, for example, betaines of formula $(R^{iii})(R^{iv})(R^{v})N^{+}CH_2COO^{-}$, where $R^{iii}$ denotes an alkyl group, which is optionally interrupted by heteroatoms or heteroatom groups, having 8 to 25, preferably 10 to 21, carbon atoms, and where $R^{iv}$ and $R^{v}$ denote identical or different alkyl groups having 1 to 3 carbon atoms, in particular $C_{10}$-$C_{18}$ alkyl dimethyl carboxymethyl betaine and $C_{11}$-$C_{17}$ alkyl amidopropyl dimethyl carboxymethyl betaine.

Suitable cationic surfactants are, inter alia, the quaternary ammonium compounds of formula $(R^{vi})(R^{iii})(R^{viii})(R^{ix})N^{+}X^{-}$, where $R^{vi}$ to $R^{ix}$ are four identical or different, in particular two long-chain and two short-chain, alkyl groups, and where $X^{-}$ is an anion, in particular a halide ion, e.g. didecyl dimethyl ammonium chloride, alkyl benzyl didecyl ammonium chloride and the mixtures thereof. Further suitable cationic surfactants are the quaternary surface-active compounds, in particular having a sulfonium, phosphonium, iodonium or arsonium group, which are also known as antimicrobial active ingredients. By using quaternary surface-active compounds having an antimicrobial effect, the agent can be provided with an antimicrobial effect or the antimicrobial effect that may already be present due to other ingredients can be improved.

The total surfactant content of such a preferably aqueous cleaning agent formulation is preferably 0.1 to 40 wt. % and particularly preferably 0.1 to 12.0 wt. %, based on the total formulation.

Further ingredients which are usually contained in cleaning agents for hard surfaces can also be contained in the cleaning agent. This group of further possible ingredients includes, but is not limited to, acids, bases, organic solvents, salts, complexing agents, fillers, builders, bleaching agents and mixtures thereof.

Water-Soluble Salts

The cleaning agent according to the invention can also contain one or more water-soluble salts in a total amount of 0.1 to 75 wt. %. These can be inorganic and/or organic salts.

Inorganic salts which can be used according to the invention are preferably selected from the group comprising colorless water-soluble halides, sulfates, sulfites, carbonates, hydrogen carbonates, nitrates, nitrites, phosphates and/or oxides of alkali metals, alkaline earth metals, aluminum and/or transition metals; ammonium salts can also be used. Halides and sulfates of the alkali metals are particularly preferred; the at least one inorganic salt is therefore preferably selected from the group comprising sodium chloride, potassium chloride, sodium sulfate, potassium sulfate and mixtures thereof. In a preferred embodiment, sodium chloride and/or sodium sulfate is used.

The organic salts which can be used according to the invention are, in particular, colorless, water-soluble alkali metal, alkaline earth metal, ammonium, aluminum and/or transition metal salts of carboxylic acids. The salts are preferably selected from the group comprising formate, acetate, propionate, citrate, malate, tartrate, succinate, malonate, oxalate, lactate and mixtures thereof.

Solvents

In one embodiment, the cleaning agent according to the invention is an aqueous cleaning agent for hard surfaces. In addition to water, in a preferred embodiment it can contain one or more further water-soluble organic solvents, usually in an amount of from 0 to 15 wt. %, preferably 1 to 12 wt. %, in particular 3 to 8 wt. %.

The solvents are used as required within the scope of the teaching according to the invention, in particular as hydrotropic agents and viscosity regulators. They have a solubilizing effect, in particular for surfactants and electrolytes, as well as perfumes and dyes, and thus contribute to their incorporation, prevent the formation of liquid-crystalline phases and contribute to the formation of clear products. The viscosity of the agent according to the invention decreases as the amount of solvent increases. Finally, as the amount of solvent increases, the cold cloudiness and clearing point of the agent according to the invention decrease.

Suitable solvents are, for example, saturated or unsaturated, preferably saturated, branched or unbranched $C_{1-20}$ hydrocarbons, preferably C2-15 hydrocarbons, with at least one hydroxyl group and optionally one or more ether functions C—O—C, i.e. oxygen atoms interrupting the carbon atom chain.

Preferred solvents are the C2-6 alkylene glycols—optionally etherified at one end with a C1-6 alkanol—and poly C2-3 alkylene glycol ethers having an average of 1 to 9 identical or different, preferably identical, alkylene glycol groups per molecule, as well as the C1-6 alcohols, preferably ethanol, n-propanol or iso-propanol.

Exemplary solvents are the following compounds as named in accordance with the INCI: Buteth-3, butoxydiglycol, butoxyethanol, butoxyisopropanol, butoxypropanol, n-butyl alcohol, t-butyl alcohol, butylene glycol, butyloctanol, diethylene glycol, dimethoxydiglycol, dimethyl ether, dipropylene glycol, ethoxydiglycol, ethoxyethanol, ethyl hexanediol, glycol, hexanediol, 1,2,6-hexanetriol, hexyl alcohol, hexylene glycol, isobutoxypropanol, isopentyldiol, isopropyl alcohol (iso-propanol), 3-methoxybutanol, methoxydiglycol, methoxyethanol, methoxyisopropanol, methoxymethylbutanol, methoxy PEG-10, methylal, methyl alcohol, methyl hexyl ether, methylpropanediol, neopentyl glycol, PEG-4, PEG-6, PEG-7, PEG-8, PEG-9, PEG-6 methyl ether, pentylene glycol, phenoxyethanol, PPG-7, PPG-2-buteth-3, PPG-2 butyl ether, PPG-3 butyl ether, PPG-2 methyl ether, PPG-3 methyl ether, PPG-2 propyl ether, propanediol, propyl alcohol (n-propanol), propylene glycol, propylene glycol butyl ether, propylene glycol propyl ether, tetrahydrofurfuryl alcohol, and trimethylhexanol.

Longer-chain polyalkylene glycols, in particular polypropylene glycols, are also preferred. PPG-400 or PPG-450, for example, are particularly preferred, but polypropylene glycols having greater chain lengths can also be used for the purposes of this invention.

The solvent is preferably selected from the group comprising ethanol, propanol, isopropanol, ethylene glycol, butyl glycol, propylene glycol, polypropylene glycols and alcohol amines, in particular monoethanolamine and mixtures thereof.

Extremely preferred solvents are the C2 and C3 alcohols, ethanol, n-propanol and/or iso-propanol and the polyalkylene glycols, especially polypropylene glycols, in particular PPG-400 and alcohol amines, in particular monoethanolamine and mixtures thereof.

A mixture of isopropanol and monoethanolamine is very particularly preferably used as the organic solvent.

In addition to the solvents described above, for example alkanolamines can also be used as solubilizers, in particular for perfume and dyes.

Builders

The cleaning agent according to the invention can furthermore contain all of the builders usually used in washing and cleaning agents, in particular silicates, carbonates, organic co-builders and also phosphates.

The silicates include crystalline, layered sodium silicates of general formula $NaMSi_xO_{2x+1}.yH_2O$, where M is sodium or hydrogen, x is a number from 1.9 to 4 and y is a number from 0 to 20 and preferred values for x are 2, 3 or 4. It is also possible to use amorphous sodium silicates with an $Na_2O$:$SiO_2$ modulus of from 1:2 to 1:3.3, preferably from 1:2 to 1:2.8 and in particular from 1:2 to 1:2.6, which also include water glass. Within the scope of the present invention, the term “amorphous” is also understood to mean “X-ray amorphous.” This means that the silicates do not supply any sharp X-ray reflexes in X-ray diffraction experiments, such as those that are typical of crystalline substances, but at best one or more maxima of the scattered X-rays, which have a width of several degree units of the diffraction angle. Furthermore, zeolites can be used as builder substances, preferably zeolite A and/or P. However, zeolite X and mixtures of A, X and/or P are also suitable.

Both the monoalkali metal salts and the dialkali metal salts of carbonic acid and also sesquicarbonates can be contained in the agents as carbonates. Preferred alkali metal ions are sodium and/or potassium ions, and so soda (sodium carbonate) and potash (potassium carbonate) are particularly preferred.

It is also possible, of course, to use the generally known phosphates as builder substances, provided that such use should not be avoided for ecological reasons. Amongst the plurality of commercially available phosphates, the alkali metal phosphates, with a particular preference for pentasodium phosphate or pentapotassium phosphate (sodium polyphosphate or potassium polyphosphate), are the most important in the washing and cleaning agent industry. “Alkali metal phosphate” is the summary name for the alkali metal (in particular sodium and potassium) salts of the various phosphoric acids, in which metaphosphoric acids $(HPO_3)_n$ and orthophosphoric acid $H_3PO_4$ can be distinguished in addition to higher molecular weight representatives. Suitable phosphates are sodium dihydrogen phosphate, $NaH_2PO_4$, disodium hydrogen phosphate (secondary sodium phosphate), $Na_2HPO_4$, trisodium phosphate, tertiary sodium phosphate, $Na_3PO_4$, tetrasodium diphosphate (sodium pyrophosphate), $Na_4P_2O_7$, as well as the higher-molecular-weight sodium and potassium phosphates formed by condensation of $NaH_2PO_4$ or $KH_2PO_4$, which include cyclic representatives, sodium or potassium metaphosphates and chain-like types, and sodium or potassium polyphosphates. A large number of terms are in use, especially for the latter: Fused or calcined phosphates, Graham’s salt, Kurrol’s and Maddrell’s salt. All higher sodium and potassium phosphates are collectively referred to as condensed phosphates.

In particular, polycarboxylates/polycarboxylic acids, polymeric polycarboxylates, aspartic acid, polyacetals, dextrins, further organic co-builders (see below) and phosphonates can be contained as organic co-builders.

Usable organic builder substances are, for example, the polycarboxylic acids that can be used in the form of the sodium salts thereof, with polycarboxylic acids being understood to mean those carboxylic acids that carry more than one acid function. These include, for example, citric acid, adipic acid, succinic acid, glutaric acid, malic acid, tartaric acid, maleic acid, fumaric acid, saccharic acids, aminocarboxylic acids, nitrilotriacetic acid (NTA), provided that the use thereof is not objectionable for ecological reasons, and mixtures thereof. Preferred salts are the salts of polycarboxylic acids such as citric acid, adipic acid, succinic acid, glutaric acid, tartaric acid, methylglycinediacetic acid, saccharic acids and mixtures thereof. In addition to the salts, the acids themselves can also be used.

Polymeric polycarboxylates are also suitable as builders; these are, for example, the alkali metal salts of polyacrylic acid or polymethacrylic acid, for example those having a relative molecular mass of from 500 to 70,000 g/mol. The molar masses given for polymeric polycarboxylates are weight-average molar masses MW of the particular acid form which have been determined in principle using gel permeation chromatography (GPC), with a UV detector having been used. The measurement was carried out against an external polyacrylic acid standard which, owing to the structural relationship thereof with the tested polymers, yields realistic molecular weight values.

In addition, copolymeric polycarboxylates are suitable, in particular those of acrylic acid with methacrylic acid and of acrylic acid or methacrylic acid with maleic acid. Copolymers of acrylic acid with maleic acid which contain 50 wt. % to 90 wt. % of acrylic acid and 50 wt. % to 10 wt. % of maleic acid have been found to be particularly suitable. The relative molecular mass thereof, based on free acids, is generally from 2,000 to 100,000 g/mol.

To improve water solubility, the polymers can also contain allyl sulfonic acids, such as allyloxybenzene sulfonic acid and methallyl sulfonic acid, as monomers.

Biodegradable polymers composed of more than two different monomer units are also particularly preferred, for example those that contain salts of acrylic acid and of maleic acid, and vinyl alcohol or vinyl alcohol derivatives as monomers, or those that contain salts of acrylic acid and of 2-alkylallylsulfonic acid and sugar derivatives as monomers.

Further preferred copolymers preferably have acrolein and acrylic acid/acrylic acid salts or acrolein and vinyl acetate as monomers.

Further suitable builder substances are polymeric aminodicarboxylic acids, or the salts or precursors thereof, in particular polyaspartic acids or the salts and derivatives thereof, as well as polyacetals which can be obtained by reacting dialdehydes with polyol carboxylic acids which have 5 to 7 carbon atoms and at least 3 hydroxyl groups, and dextrins, for example oligomers or polymers of carbohydrates, which can be obtained by partial hydrolysis of starches. These dextrins are preferably hydrolysis products having an average molar mass in the range of from 400 to 500,000 g/mol.

Oxydisuccinates and other derivatives of disuccinates, preferably ethylenediamine-N,N'-disuccinate (EDDS), are further suitable co-builders, preferably in the form of the sodium or magnesium salts thereof, furthermore iminodisuccinates (IDS) and the derivatives thereof, for example hydroxyiminodisuccinates (HDIS), as well acetylated hydroxycarboxylic acids or the salts thereof, which may also be in lactone form and which contain at least 4 carbon atoms and at least one hydroxyl group and a maximum of two acid groups.

A further class of substances having co-builder properties is phosphonates. These include, in particular, hydroxyalkane and aminoalkane phosphonates. Among the hydroxyalkane-phosphonates, 1-hydroxyethane-1,1-diphosphonate (HEDP) is of particular importance as a co-builder. It is preferably used as a sodium salt, the disodium salt reacting in a neutral manner and the tetrasodium salt reacting in an alkaline manner (pH 9). Possible preferable aminoalkane phosphonates include ethylenediamine tetramethylene phosphonate (EDTMP), diethylenetriamine pentamethylene phosphonate (DTPMP) and the higher homologs thereof. They are preferably used in the form of the neutrally reacting sodium salts, for example as the hexasodium salt of EDTMP or as the hepta- and octa-sodium salt of DTPMP. Of the class of phosphonates, HEDP is preferably used as a builder. The aminoalkane phosphonates additionally have a pronounced capability to bind heavy metals. Accordingly, it may be preferred, in particular if the agents also contain bleach, to use aminoalkane phosphonates, in particular DTPMP, or to use mixtures of the mentioned phosphonates.

Moreover, all compounds that are able to form complexes with alkaline earth ions can be included in the particulate agents as co-builders.

Acids

One or more acids and/or the salts thereof may be included to enhance the cleaning performance against limescale. The acids are preferably produced from renewable raw materials. Therefore, in particular organic acids, such as formic acid, acetic acid, citric acid, glycolic acid, lactic acid, succinic acid, adipic acid, malic acid, tartaric acid and gluconic acid, and mixtures thereof, are suitable as acids. In addition, however, the inorganic acids hydrochloric acid, sulfuric acid, phosphoric acid and nitric acid, or also sulfamic acid or mixtures thereof, can also be used. The acids and/or salts thereof selected from the group comprising citric acid, lactic acid, formic acid, the salts thereof, and mixtures thereof are particularly preferred. Said acids and/or salts are used in amounts of 0.01 to 10 wt. %, particularly preferably 0.2 to 5 wt. %.

Bases

Alkalis can also be contained in cleaning agent blocks according to the invention. Bases from the group of the alkali and alkaline earth metal hydroxides and carbonates, in particular sodium carbonate or sodium hydroxide, are preferably used as bases in agents according to the invention. In addition, however, ammonia and/or alkanolamines having up to 9 C atoms in the molecule, preferably ethanolamines, in particular monoethanolamine, can also be used.

Complexing Agents

Complexing agents (INCI chelating agents), also referred to as sequestering agents, are ingredients which allow metal ions to form complexes and to become inactive in order to prevent disadvantageous effects of said ions on the stability or the appearance of the cleaning agent according to the invention, for example cloudiness. It is important to complex the calcium and magnesium ions of the water hardness, which ions are incompatible with many ingredients. However, complexing ions of heavy metals such as iron or copper delays the oxidative decomposition of the finished agents. In addition, the complexing agents assist with the cleaning effect.

For example the following complexing agents, named in accordance with INCI, are suitable: Aminotrimethylene phosphonic acid, beta-alanine diacetic acid, calcium disodium EDTA, citric acid, cyclodextrin, cyclohexanediamine tetraacetic acid, diammonium citrate, diammonium EDTA, diethylenetriamine pentamethylene phosphonic acid, dipotassium EDTA, disodium azacycloheptane diphosphonate, disodium EDTA, disodium pyrophosphate, EDTA, etidronic acid, galactaric acid, gluconic acid, glucuronic acid, HEDTA, hydroxypropyl cyclodextrin, methyl cyclodextrin, pentapotassium triphosphate, pentasodium aminotrimethylene phosphonate, pentasodium ethylenediamine tetramethylene phosphonate, pentasodium pentetate, pentasodium triphosphate, pentetic acid, phytic acid, potassium citrate, potassium EDTMP, potassium gluconate, potassium polyphosphate, potassium trisphosphonomethylamine oxide, ribonic acid, sodium chitosan methylene phosphonate, sodium citrate, sodium diethylenetriamine pentamethylene phosphonate, sodium dihydroxyethylglycinate, sodium EDTMP, sodium gluceptate, sodium gluconate, sodium glycereth-1 polyphosphate, sodium hexametaphosphate, sodium metaphosphate, sodium metasilicate, sodium phytate, sodium polydimethylglycinophenolsulfonate, sodium trimetaphosphate, TEA-EDTA, TEA-polyphosphate, tetrahydroxyethyl ethylenediamine, tetrahydroxypropyl ethylenediamine, tetrapotassium etidronate, tetrapotassium pyrophosphate, tetrasodium EDTA, tetrasodium etidronate, tetrasodium pyrophosphate, tripotassium EDTA, trisodium dicarboxymethyl alaninate, trisodium EDTA, trisodium HEDTA, trisodium NTA and trisodium phosphate Bleaching Agents According to the invention, bleaching agents can be added to the cleaning product. Suitable bleaching agents include peroxides, peroxy acids and/or perborates, with sodium percarbonate or phthalimidoperoxyhexanoic acid being particularly preferred. In contrast, chlorinated bleaching agents such as trichloroisocyanuric acid or sodium dichloroisocyanurate are less suitable for use with acid-formulated cleaning agents because they release toxic chlorine gas vapors, but they can be used in alkaline-formulated cleaning agents, however. In some circumstances, a bleach activator may also be required in addition to the bleaching agent.

Compounds which, under perhydrolysis conditions, result in aliphatic peroxocarboxylic acids having preferably 1 to 10 C atoms, in particular 2 to 4 C atoms, and/or optionally substituted perbenzoic acid, may be used as bleach activators. From all the bleach activators known to a skilled person from the prior art, polyacylated alkylendiamines, in particular tetraacetylethylenediamine (TAED), acylated triazine derivates, in particular 1,5-diacetyl-2,4-dioxohexahydro-1,3,5-triazine (DADHT), acylated glycolurils, in particular tetraacetylglycoluril (TAGU), N-acylimides, in particular N-nonanoylsuccinimide (NOSI), acylated phenol sulfonates, in particular n-nonanoyl or isononanoyl oxybenzene sulfonate (n- or iso-NOBS), are particularly preferably used. Combinations of conventional bleach activators can also be used. Said bleach activators are preferably used in amounts of up to 10 wt. %, in particular 0.1 wt. % to 8 wt. %, especially 2 to 8 wt. % and particularly preferably 2 to 6 wt. %, in each case based on the total weight of the bleach-activator-containing agent.

Auxiliaries and Additives

In addition to the components mentioned above, the agent according to the invention can contain one or more other auxiliaries and additives which are customary in cleaning agents for hard surfaces in particular. These include, for example, organic adjusting agents (in particular sugar, sugar alcohols, glycerol, glycols and polymers thereof), hydrophobicity agents (such as paraffin), UV stabilizers, perfume oils, antimicrobial active ingredients, pearlescent agents (INCI opacifying agents; for example glycol distearate, e.g. Cutina® AGS from BASF, or mixtures containing this, e.g. Euperlane® from BASF), other opacifiers, dyes, corrosion inhibitors, bittering agents, preservatives (e.g. the technical substance 2-bromo-2-nitropropane-1, 3-diol (CAS 52-51-7), also known as bronopol, which is commercially available, for example, as Myacide® BT or as Boots Bronopol BT from Boots, or also mixtures containing bronopol such as Preventol® (ex Lanxess) or Parmetol® (ex Schülke & Mayr)), disinfectants, enzymes, pH adjusters, fragrances and additives that improve the feel on the skin or skin care (e.g. dermatologically active substances such as vitamin A, vitamin B2, vitamin B12, vitamin C, vitamin E, D-panthenol, sericerin, collagen partial hydrolyzate, various vegetable protein partial hydrolyzates, protein hydrolyzate fatty acid condensates, liposomes, cholesterol, vegetable and animal oils such as lecithin, soybean oil, etc., plant extracts such as aloe vera, azulene, witch hazel extracts, algae extracts, etc., allantoin, AHA complexes, glycerol, urea, quaternized hydroxyethyl cellulose), additives to improve the drainage and drying behavior or for stabilization. These auxiliaries and additives are contained, in particular, in amounts of usually no more than 5 wt. %. In addition to the components mentioned above, the agent according to the invention can contain one or more other auxiliaries and additives which are customary in cleaning agents for hard surfaces in particular. These include, for example, organic adjusting agents (in particular sugar, sugar alcohols, glycerol, glycols and polymers thereof), hydrophobicity agents (such as paraffin), UV stabilizers, perfume oils, antimicrobial active ingredients, pearlescent agents (INCI opacifying agents; for example glycol distearate, e.g. Cutina® AGS from BASF, or mixtures containing this, e.g. Euperlane® from BASF), other opacifiers, dyes, corrosion inhibitors, bittering agents, preservatives (e.g. the technical substance 2-bromo-2-nitropropane-1, 3-diol (CAS 52-51-7), also known as bronopol, which is commercially available, for example, as Myacide® BT or as Boots Bronopol BT from Boots, or also mixtures containing bronopol such as Preventol® (ex Lanxess) or Parmetol® (ex Schülke & Mayr)), disinfectants, enzymes, pH adjusters, fragrances and additives that improve the feel on the skin or skin care (e.g. dermatologically active substances such as vitamin A, vitamin B2, vitamin B12, vitamin C, vitamin E, D-panthenol, sericerin, collagen partial hydrolyzate, various vegetable protein partial hydrolyzates, protein hydrolyzate fatty acid condensates, liposomes, cholesterol, vegetable and animal oils such as lecithin, soybean oil, etc., plant extracts such as aloe vera, azulene, witch hazel extracts, algae extracts, etc., allantoin, AHA complexes, glycerol, urea, quaternized hydroxyethyl cellulose), additives to improve the drainage and drying behavior or for stabilization. These auxiliaries and additives are contained, in particular, in amounts of usually no more than 5 wt. %.

Fragrances

The product according to the invention can contain one or more fragrances, preferably in an amount of from 0.01 to 10 wt. %, in particular 0.05 to 8 wt. %, particularly preferably 0.1 to 5 wt. %. D-limonene can be contained as a perfume component. In another embodiment, the cleaning agent block according to the invention contains a perfume consisting of essential oils. For example pine, citrus, jasmine, patchouli, rose, or ylang-ylang oil can be used as said oils within the meaning of the invention. Clary sage oil, chamomile oil, lavender oil, clove oil, lemon balm oil, mint oil, cinnamon leaf oil, lime blossom oil, juniper berry oil, vetiver oil, olibanum oil, galbanum oil, and labdanum oil, as well as orange blossom oil, neroli oil, orange peel oil, and sandalwood oil are also suitable. Other fragrances usually used in washing and cleaning agents are also suitable for use in the cleaning agent block according to the invention, for example other essential oils, esters, alcohols, aldehydes or terpenes.

Antimicrobial Active Ingredients

Disinfection and sanitation are a particular form of cleaning. In a corresponding particular embodiment of the invention, the cleaning agent therefore contains one or more antimicrobial active ingredients, preferably in an amount of from 0.01 to 1 wt. %, more preferably 0.02 to 0.8 wt. %, in particular 0.05 to 0.5 wt. %, particularly preferably 0.1 to 0.3 wt. %, most preferably 0.2 wt. %.

The terms “disinfection,” “sanitation,” “antimicrobial effect” and “antimicrobial active ingredient” have the conventional meaning thereof within the scope of the teaching according to the invention. While disinfection, in the narrower sense of medical practice, means killing-theoretically all-infectious germs, sanitation is to be understood as eliminating, as far as possible, all germs, including saprophytic germs that are usually harmless to humans. In this case, the extent of the disinfection or sanitation depends on the antimicrobial effect of the agent used, which effect reduces as the content of antimicrobial active ingredient decreases or as the agent to be used becomes increasingly diluted.

For example, antimicrobial active ingredients from the groups of the alcohols, aldehydes, antimicrobial acids and the salts thereof, carboxylic acid esters, acid amides, phenols, phenol derivatives, diphenyls, diphenyl alkanes, urea derivatives, oxygen and nitrogen acetals and methylals, benzamidines, isothiazoles and the derivatives thereof, such as isothiazolins and isothiazolinones, phthalimide derivatives, pyridine derivatives, antimicrobial surface-active compounds, guanidines, antimicrobial amphoteric compounds, quinolines, 1,2-dibromo-2,4-dicyanobutane, iodo-2-propynyl-butyl-carbamate, iodine, iodophors, compounds which release active chlorine, and peroxides are suitable according to the invention. Preferred antimicrobial active ingredients are preferably selected from the group comprising ethanol, n-propanol, i-propanol, 1,3-butanediol, phenoxyethanol, 1,2-propylene glycol, glycerol, undecylenic acid, citric acid, lactic acid, benzoic acid, salicylic acid, thymol, 2-benzyl-4-chlorophenol, 2,2'-methylene-bis(6-bromo-4-chlorophenol), 2,4,4'-trichloro-2'-hydroxydiphenyl ether, N-(4-chlorophenyl)-N'-(3,4-dichlorophenyl)urea, N,N'-(1,10-decanediyldi-1-pyridinyl-4-ylidene)-bis-(1-octanamine)-dihydrochloride, N,N'-bis-(4-chlorophenyl)3,12-diimino-2,4,11,13-tetraazatetradecandiimidamide, antimicrobial quaternary surface-active compounds, guanidines and sodium dichloroisocyanurate (DCI, 1,3-dichloro-5H-1, 3,5-triazine-2,4,6-trione sodium salt). Preferred antimicrobially acting surface-active quaternary compounds contain an ammonium, sulfonium, phosphonium, iodonium or arsonium group. Furthermore, antimicrobially effective essential oils can also be used which simultaneously fragrance the cleaning product. Particularly preferred antimicrobial active ingredients are, however, selected from the group comprising salicylic acid, quaternary surfactants, in particular benzalkonium chloride, peroxo compounds, in particular hydrogen peroxide, alkali metal hypochlorite, sodium dichloroisocyanurate and mixtures thereof.

Preservatives

Cleaning agent products according to the invention can also contain preservatives. The substances mentioned under the antimicrobial active ingredients can substantially be used as preservatives of this kind.

Dyes

The cleaning agent product according to the invention can contain one or more dyes (INCI colorants) as further ingredients. In this case, water-soluble and oil-soluble dyes can be used as dyes, with it being important that the compatibility with further ingredients, for example bleaching agents, is taken into account and that the dye used should not significantly affect the metal and ceramic material, even after long-term use. The dyes are preferably contained in an amount of from 0.0001 to 0.1 wt. %, in particular 0.0005 to 0.05 wt. %, particularly preferably 0.001 to 0.01 wt. %.

Corrosion Inhibitors

Suitable corrosion inhibitors (INCI corrosion inhibitors) are, for example, the following substances, named in accordance with INCI: Cyclohexylamine, diammonium phosphate, dilithium oxalate, dimethylamino methylpropanol, dipotassium oxalate, dipotassium phosphate, disodium phosphate, disodium pyrophosphate, disodium tetrapropenyl succinate, hexoxyethyl diethylammonium, phosphate, nitromethane, potassium silicate, sodium aluminate, sodium hexametaphosphate, sodium metasilicate, sodium molybdate, sodium nitrite, sodium oxalate, sodium silicate, stearamidopropyl dimethicone, tetrapotassium pyrophosphate, tetrasodium pyrophosphate, and triisopropanolamine.

Rinsing Regulators

The substances referred to as rinsing regulators are primarily used to control the consumption of the agent during use such that the intended service life is met. Solid long-chain fatty acids such as stearic acid, but also salts of such fatty acids, fatty acid ethanolamides, such as coconut fatty acid monoethanolamide, or solid polyethylene glycols, such as those having molecular weights of between 10,000 and 50,000, are preferably suitable as regulators.

Enzymes

The cleaning product can also contain enzymes, preferably proteases, lipases, amylases, hydrolases and/or cellulases. They can be added to the agent according to the invention in any form established according to the prior art. These include solutions of the enzymes, advantageously as concentrated as possible, low in water and/or mixed with stabilizers. Alternatively the enzymes can also be encapsulated, for example by spray-drying or extruding the enzyme solution together with a preferably natural polymer or in the form of capsules, for example those in which the enzymes are enclosed in a solidified gel, or in the form of the core-shell type in which an enzyme-containing core is coated with a water-, air-, and/or chemical-impermeable protective layer. Other active ingredients such as stabilizers, emulsifiers, pigments, bleaching agents, or dyes can additionally be applied in overlaid layers. Such capsules are applied using methods that are known per se, for example by shaking or roll granulation or in fluidized bed processes. Advantageously, such granules are low in dust, for example due to the application of polymeric film-formers, and stable in storage due to the coating.

Furthermore, enzyme stabilizers can be present in enzyme-containing cleaning products in order to protect an enzyme contained against damage such as inactivation, denaturation or decomposition caused, for example, by physical influences, oxidation, or proteolytic cleavage. Depending on the enzyme used in each case, suitable enzyme stabilizers are in particular: Benzamidine hydrochloride, borax, boric acid, boronic acid or the salts or esters thereof, in particular derivatives having aromatic groups, such as substituted phenylboronic acids or the salts or esters thereof; peptide aldehydes (oligopeptides having a reduced C-terminus), amino alcohols such as mono-, di-, triethanol- and -propanolamine and the mixtures thereof, aliphatic carboxylic acids up to $C_{12}$, such as succinic acid, other dicarboxylic acids or salts of the mentioned acids; end-capped fatty acid amide alkoxylates; low aliphatic alcohols and in particular polyols, for example glycerol, ethylene glycol, propylene glycol or sorbitol; and reducing agents and antioxidants such as sodium sulfite and reducing sugars. Further suitable stabilizers are known from the prior art. Preferably, combinations of stabilizers are used, for example the combination of polyols, boric acid and/or borax, the combination of boric acid or borate, reducing salts and succinic acid or other dicarboxylic acids, or the combination of boric acid or borate with polyols or polyamino compounds and with reducing salts.

pH

The pH of the agents according to the invention can be adjusted by means of conventional pH regulators, for example citric acid or NaOH. It is preferred in this case if the agent has a pH in a range of from 5 to 11.5, preferably 7 to 11.3.

To adjust and/or stabilize the pH, the agent according to the invention can also contain one or more buffer substances (INCI buffering agents), usually in amounts of from 0.001 to 5 wt. %, preferably 0.005 to 3 wt. %, in particular 0.01 to 2 wt. %, particularly preferably 0.05 to 1 wt. %, extremely preferably 0.1 to 0.5 wt. %, for example 0.2 wt. %. Buffer substances, which are also complexing agents or even chelating agents (chelators, INCI chelating agents), are preferred. Particularly preferred buffer substances are citric acid or citrates, in particular sodium and potassium citrates, for example trisodium citrate.$2H_2O$ and tripotassium citrate $H_2O$.

The invention is described in more detail with reference to the following drawings and examples:

FIG. 1 shows a cleaning robot 1 comprising a cleaning cloth 10 in a view from below. The cleaning robot 1 guides the cleaning cloth 10 over a hard surface. The cleaning robot 1 is moved over the hard surface by means of wheels 20. The cleaning robot 1 moves at a certain speed in the direction indicated by the dashed arrow.

Figure 2:
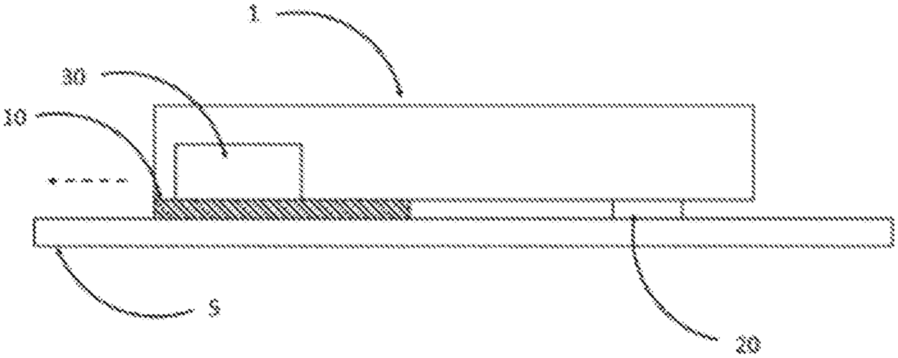
FIG. 2 shows the cleaning robot comprising the cleaning cloth in a view from the side.

FIG. 2 shows the cleaning robot 1 comprising the cleaning cloth 10 in a view from the side. The cleaning agent is conveyed out of the cleaning agent tank 30 and is first applied to the cleaning cloth 10 and then applied directly by means of the cleaning cloth 10 to the surface 5 to be cleaned. In the case of automatic surface cleaning by means of the cleaning robot 1, the cleaning agent is thus applied to the hard surface 5 when the robot moves, and the wiping process taking place substantially at the same time as the cleaning agent is applied. In contrast with manual cleaning, the surfactants only have a short time to accumulate on the surface of the cleaning agent film that has formed and thus reduce the surface tension. In other words, the cleaning agent generally does not have its equilibrium value during the automatic cleaning process. In order to enable effective cleaning, a cleaning agent must be used in which a sufficiently strong reduction in surface tension has already taken place shortly after film formation.

Table 1 below shows the concentrated composition used:

TABLE 1

| Component | Amount AS [wt. %] |
|---|---|
| Water | 93.8 |
| Sodium hydroxide | 0.1 |
| Alkylbenzene sulfonate | 0.4 |
| Fatty acid | 0.1 |
| Fatty alcohol ethoxylate C6, 5 EO | 0.3 |
| Fatty alcohol ethoxylate C12-18, 7 EO | 0.1 |
| Isopropanol | 1.5 |
| Phenoxyethanol, pure | 1.0 |
| Perfume, dyes | >3 |
| Monoethanolamines | 1.5 |
| Preservatives | >3 |

The amounts stated are to be understood as an active substance in the concentrated composition.

Table 2 below shows the surface tension which was determined for the composition according to Table 1 after diluting 18 ml of concentrated cleaning agent with 250 ml of water (temperature 23° C.). The pH in the (diluted) composition used was pH=10.6.

TABLE 2

| Surface age [seconds] | Surface tension [mN/cm] |
|---|---|
| 0.08 | 40.0 |
| 0.22 | 35.5 |
| 0.31 | 34.2 |
| 0.44 | 33.1 |
| 0.87 | 31.3 |
| 1.2 | 30.3 |

The cleaning agent presented here by way of example has a surface tension of approximately 34 mN/cm when measured dynamically at 23° C. at a surface age of 0.3 seconds and is thus below the particularly preferred limit value of 35 mN/cm.

The cleaning agent shown is therefore particularly well suited for use with the cleaning robot according to the invention. There is thus a sufficiently strong reduction in surface tension soon after film formation and thus a preferred cleaning performance. However, the given composition is only to be understood as exemplary and not restrictive. By changing individual constituents and dilution parameters of other compositions, a person skilled in the art will be able to adjust the surface tension (lower the surface tension) according to the invention.

What is claimed is:

1. A cleaning robot comprising a cleaning cloth and a concentrated cleaning agent, with the cleaning robot being designed to guide the cleaning cloth over a hard surface and the concentrated cleaning agent comprising at least one surfactant, wherein the cleaning robot is designed to guide the cleaning cloth over the hard surface at a speed of at least 5 cm/s, and the cleaning robot is configured to dilute the concentrated cleaning agent with water in the cleaning robot to form a cleaning agent, wherein after at least a ten-fold dilution, the cleaning agent has a surface tension of at most 40 mN/cm when measured dynamically at 23° C. at a surface age of 0.3 seconds.

2. The cleaning robot according to claim 1, wherein a change in the surface tension of the cleaning agent is at least 2 mN/cm within a surface lifetime of 0.3 seconds when measured dynamically at 23° C.

3. The cleaning robot according to claim 2, wherein the change in the surface tension of the cleaning agent is at least 5 mN/cm within a surface lifetime of 0.3 seconds when measured dynamically at 23° C.

4. The cleaning robot according to claim 1, wherein a reduction in the surface tension of the cleaning agent is at least 3 mN/cm within a surface lifetime of 0.3 seconds when measured dynamically at 23° C.

5. The cleaning robot according to claim 4, wherein the reduction in the surface tension of the cleaning agent is at least 5 mN/cm within a surface lifetime of 0.3 seconds when measured dynamically at 23° C.

6. The cleaning robot according to claim 1, wherein the cleaning robot is designed to convey the cleaning agent out of a cleaning agent tank and apply it to the cleaning cloth.

7. The cleaning robot according to claim 1, wherein the cleaning agent has a surface tension of at most 38 mN/cm when measured dynamically at 23° C. at a surface age of 0.3 seconds.

8. The cleaning robot according to claim 1, wherein the cleaning agent has a surface tension of at most 35 mN/cm when measured dynamically at 23° C. at a surface age of 0.3 seconds.

9. The cleaning robot according to claim 1, wherein the cleaning robot is designed to guide the cleaning cloth over the hard surface at a speed of at least 10 cm/s.

10. The cleaning robot according to claim 1, wherein the cleaning robot is designed to guide the cleaning cloth over the hard surface at a speed of at least 20 cm/s.

11. A concentrated cleaning agent for use in a cleaning robot, wherein after at least ten-fold dilution in the cleaning robot, has a surface tension of at most 40 mN/cm when measured dynamically at 23° C. at a surface age of 0.3 seconds.

12. The concentrated cleaning agent according to claim 11, wherein after at least ten-fold dilution in the cleaning robot, has a surface tension of at most 38 mN/cm when measured dynamically at 23° C. at a surface age of 0.3 seconds.

13. The concentrated cleaning agent according to claim 11, wherein after at least ten-fold dilution in the cleaning robot, has a surface tension of at most 35 mN/cm when measured dynamically at 23° C. at a surface age of 0.3 seconds.

14. A method for cleaning a hard surface, comprising having a cleaning robot comprising a cleaning cloth and a concentrated cleaning agent, guiding the cleaning cloth over the hard surface at a speed of at least 5 cm/s, wherein the concentrated cleaning agent comprises at least one surfactant, diluting the concentrated cleaning agent with water in the cleaning robot to form a cleaning agent, wherein after at least a ten-fold dilution in the cleaning robot, the cleaning agent has a surface tension of at most 40 mN/cm when measured dynamically at 23° C. at a surface age of 0.3 seconds, and applying the cleaning agent to the cleaning cloth.

15. The method for cleaning a surface, according to claim 14, wherein the cleaning cloth is guided over the hard surface at a speed of at least 10 cm/s.

16. The method for cleaning a surface, according to claim 14, wherein the cleaning cloth is guided over the hard surface at a speed of at least 20 cm/s.

* * * * *